(12) United States Patent
Zhao

(10) Patent No.: US 9,009,180 B2
(45) Date of Patent: Apr. 14, 2015

(54) SYSTEM AND METHOD FOR PROVIDING EXTENDING SEARCHES

(71) Applicant: Ge Zhao, Surrey (CA)

(72) Inventor: Ge Zhao, Surrey (CA)

( * ) Notice: Subject to any disclaimer, the term of this patent is extended or adjusted under 35 U.S.C. 154(b) by 33 days.

(21) Appl. No.: 13/739,356

(22) Filed: Jan. 11, 2013

(65) Prior Publication Data

US 2014/0201186 A1    Jul. 17, 2014

(51) Int. Cl.
  *G06F 7/00*      (2006.01)
  *G06F 17/30*     (2006.01)
(52) U.S. Cl.
  CPC ... *G06F 17/30867* (2013.01); *Y10S 707/99933* (2013.01)
(58) Field of Classification Search
  None
  See application file for complete search history.

(56) References Cited

U.S. PATENT DOCUMENTS

| | | | | |
|---|---|---|---|---|
| 6,247,038 B1 * | 6/2001 | Banks et al. | | 718/100 |
| 8,443,290 B2 * | 5/2013 | Bill | | 715/753 |
| 2011/0296004 A1 * | 12/2011 | Swahar | | 709/224 |

* cited by examiner

*Primary Examiner* — Azam Cheema
(74) *Attorney, Agent, or Firm* — James M Smedley LLC; James M. Smedley, Esq.

(57) ABSTRACT

The present invention generally relates to computer and web-based contact searches. Specifically, this invention relates to systems and methods for extending contact searches to include contacts beyond those of the user initiating the search. Embodiments of the present invention allow users to search for indirect contacts beyond their direct contacts by providing the user results that include the contacts of their contacts and so on to a specified depth level and restricted by security implementations selectable by the indirect contacts.

12 Claims, 21 Drawing Sheets

FIG.7A

FIG. 8

SYSTEM AND METHOD FOR PROVIDING EXTENDING SEARCHES

FIELD OF THE INVENTION

The present invention generally relates to computer and web-based contact searches. Specifically, this invention relates to systems and methods for extending contact searches to include contacts beyond those of the user initiating the search. Embodiments of the present invention allow users to search for indirect contacts beyond their direct contacts by providing the user results that include the contacts of their contacts and so on to a specified depth level and restricted by security implementations selectable by the indirect contacts.

BACKGROUND

Tremendous changes have been occurring in the Internet that influence everyday lives of people. Online social networks have become part of many people's daily routines and meeting grounds. The development of such online social networks has already touched countless aspects of social lives, providing convenient access to people of similar interests and hobbies, and enabling people to make friends in more ways than ever before.

Today, a search of the data of contacts is generally allowed in most popular social network because it is not regarded as a violation of privacy. Most social network sites have begun to allow users to perform a search about their friends to find items of mutual interest within their network database. However, at least two problems exist with current user contact search features: (i) user search capabilities are not able to be restricted by the contacts being searched; and (ii) no ability to restrict contact to users who are not direct contacts of the searching user.

Firstly, most networks (social, service or otherwise) that allow for contact searches are unrestricted, such as those utilized by dating and matchmaking websites, allowing for users to search for other contacts/users by one or more attributes, but users have no way to prevent their information from being searched (except perhaps entirely by deleting or suspending their profiles).

Secondly, no network (social, service or otherwise) provides the ability for requiring users to make contact to an indirect contact through one or more direct contacts, thereby preventing cold contacts in situations where an indirect user may not wish to be contacted by users not referred by one or more of their direct contacts.

In many cases, it would be desirable to have a network of any type that (i) allows for contact searches which non-direct contacts could preemptively decide to be not included in and further, whether in combination with the previous requirement or independently, (ii) require any indirect contact made be done through an intermediary or middleman who is a direct contact to the targeted indirect contact.

Therefore, there is need in the art for a computer based systems and methods for (i) extending contact searches to indirect contacts beyond a user's direct contacts and (ii) restricting user contact to indirect contacts through use of an intermediary or middleman. These and other features and advantages of the present invention will be explained and will become obvious to one skilled in the art through the summary of the invention that follows.

SUMMARY OF THE INVENTION

Accordingly, it is an aspect of the present invention to provide a computer based system and method for providing users the ability to search for indirect contacts through their direct contacts where the indirect contacts have not otherwise selected to restrict extended searches through one or more security implementations. Further, it is an aspect of the present invention to provide a computer based system and method for restricting user contact to indirect contacts through use of an intermediary or middleman.

According to an embodiment of the present invention, a computer implemented system for providing an extending search, includes: an extending search service list management component comprising computer-executable code stored in non-volatile memory; a search engine component comprising computer-executable code stored in non-volatile memory; a data management component comprising computer-executable code stored in non-volatile memory; a search processing management component comprising computer-executable code stored in non-volatile memory; a processor; and a communications means, wherein the extending search service list management component, the search engine component, the data management component, the search processing management component, the processor, and the communications means are operably connected and are configured to: receive a request from a first user regarding an extending search for one or more contacts; retrieve an extending service contact list associated with the first user, wherein the extending service contact list comprises data associated with one or more direct contacts; and identify a group of contacts comprising one or more indirect contacts, wherein each of the one or more indirect contacts (i) is not one of the one or more direct contacts and (ii) is a direct contact of at least one of the one or more direct contacts.

According to an embodiment of the present invention, the extending search service list is generated from a list of contacts associated with the first user.

According to an embodiment of the present invention, the data associated with the one or more direct contacts includes information related to whether the first user can use one or more of the one or more direct contacts as an entry contact.

According to an embodiment of the present invention, the extending search service list management component, the search engine component, the data management component, the search processing management component, the processor, and the communications means are further configured to: enter a liberal mode; and return the group of contacts to the first user.

According to an embodiment of the present invention, the extending search service list management component, the search engine component, the data management component, the search processing management component, the processor, and the communications means are further configured to: enter a strict mode; generate a first message to at least one direct contact of the one or more direct contacts; and transmit the first message to the at least one direct contact.

According to an embodiment of the present invention, the extending search service list management component, the search engine component, the data management component, the search processing management component, the processor, and the communications means are further configured to: receive middleman approval from the at least one direct contact; generate a middleman message from the at least one direct contact; transmit the middleman message to at least one contact identified in the group of contacts.

According to an embodiment of the present invention, the middleman message includes search information contained in the request.

According to an embodiment of the present invention, the message includes search information contained in the request.

According to an embodiment of the present invention, the group of contacts includes contact information for each contact in the group of contacts.

According to an embodiment of the present invention, a computer implemented method for providing an extending search includes the steps of: receiving a request from a first user regarding an extending search for one or more contacts; retrieving an extending service contact list associated with the first user, wherein the extending service contact list comprises data associated with one or more direct contacts; and identifying a group of contacts comprising one or more indirect contacts, wherein each of the one or more indirect contacts (i) is not one of the one or more direct contacts and (ii) is a direct contact of at least one of the one or more direct contacts.

According to an embodiment of the present invention, the method further includes the steps of: entering a liberal mode; and returning the group of contacts to the first user.

According to an embodiment of the present invention, the method further includes the steps of: entering a strict mode; generating a first message to at least one direct contact of the one or more direct contacts; and transmitting the first message to the at least one direct contact.

According to an embodiment of the present invention, the method further includes the steps of: receiving middleman approval from the at least one direct contact; generating a middleman message from the at least one direct contact; transmitting the middleman message to at least one contact identified in the group of contacts.

The foregoing summary of the present invention with the preferred embodiments should not be construed to limit the scope of the invention. It should be understood and obvious to one skilled in the art that the embodiments of the invention thus described may be further modified without departing from the spirit and scope of the invention.

BRIEF DESCRIPTION OF THE DRAWINGS

FIG. 7A-C are illustrations of a graphical user interface for performing an extending search, in accordance with an embodiment of the present invention;

FIG. 8 illustrates a graphical user interface showing results of an extending search, in accordance with an embodiment of the present invention;

DETAILED SPECIFICATION

Figure 1:
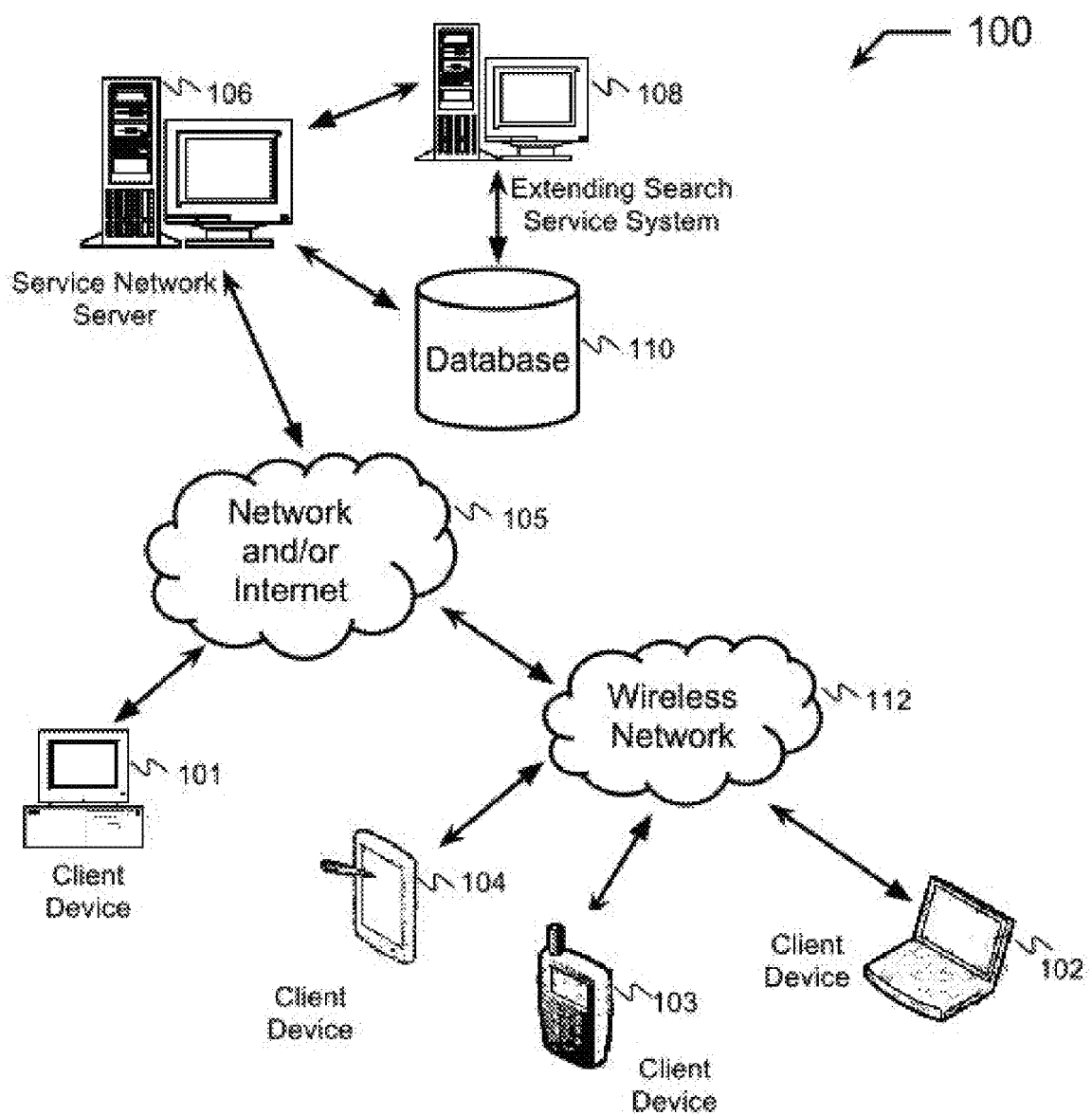
FIG. 1 illustrates a network schematic of an extending search system, in accordance with an embodiment of the present invention.

The present invention generally relates to computer and web-based contact searches. Specifically, this invention relates to systems and methods for extending contact searches to include contacts beyond those of the user initiating the search. Embodiments of the present invention allow users to search for indirect contacts beyond their direct contacts by providing the user results that include the contacts of their contacts and so on to a specified depth level and restricted by security implementations selectable by the indirect contacts. Certain embodiments of the present invention require one or middlemen to be engaged by the user prior to contacting one or more indirect contacts.

According to an embodiment of the present invention, the systems and methods are accomplished through the use of one or more computing devices. One of ordinary skill in the art would appreciate that a computing device appropriate for use with embodiments of the present application may generally be comprised of one or more of a Central processing Unit (CPU), Random Access Memory (RAM), and a storage medium (e.g., hard disk drive, solid state drive, flash memory, cloud storage). Examples of computing devices usable with embodiments of the present invention include, but are not limited to, personal computers, smart phones, laptops, mobile computing devices, tablet PCs and servers. The term computing device may also describe two or more computing devices communicatively linked in a manner as to distribute and share one or more resources, such as clustered computing devices and server banks/farms. One of ordinary skill in the art would understand that any number of computing devices could be used, and embodiments of the present invention are contemplated for use with any computing device.

In an exemplary embodiment according to the present invention, data may be provided to the system, stored by the system and provided by the system to users of the system across local area networks (LANs) (e.g., office networks, home networks) or wide area networks (WANs) (e.g., the Internet). In accordance with the previous embodiment, the system may be comprised of numerous servers communicatively connected across one or more LANs and/or WANs. One of ordinary skill in the art would appreciate that there are numerous manners in which the system could be configured and embodiments of the present invention are contemplated for use with any configuration.

In general, the system and methods provided herein may be consumed by a user of a computing device whether connected to a network or not. According to an embodiment of the present invention, some of the applications of the present invention may not be accessible when not connected to a network; however a user may be able to compose data offline that will be consumed by the system when the user is later connected to a network.

A goal of certain embodiments of the present invention relate to systems and methods for offering a service network (e.g., social network, service network, professional network) user a possibility to find target people by searching data associated with contacts of the service network user's contacts with the network. In certain embodiments, data to be searched is not limited to personal data (attributes) and may also include searchable data associated with the type of service network. For instance, player ranking, player level and game score in a service network associated with a game community could be used as searchable data. In other embodiments, searchable data may be obtained and utilized from multiple service networks in a single search. For instance, data could be used from the aforementioned service network associated with a game community as well as data from a service network associated with a dating or matchmaking community/internet service.

For the purpose of the present disclosure, the procedure with a purpose of finding target contacts by searching the relevant data of the contacts of user's contacts is defined as an "extending search" in the present disclosure. An exemplary embodiment of the system of the present invention is defined as an "extending search system". An extending search system may be comprised of one or more components comprising software and integrated hardware provided for the purpose of automating processing of searches requested by users of the system.

According to an embodiment of the present invention, the extending search system may be integrated into or communicatively connected to one or more service networks which have data and/or information regarding one or more users. Preferably, the service networks organize the data into a relational manner whereby the one or more users are interconnected or related through a cognizable association between the various users. In a preferred embodiment, the data of the service networks is stored or otherwise maintained in a database where each user has a contact list that can be used as an entry to conduct an extending search.

In certain embodiments, the service network could be a social network, an instant messaging network, an email network, a communications application, a module comprising applications and software that provides contact or friend list management and personal data store service to user, or any combination thereof. One of ordinary skill in the art would appreciate that there are numerous types of service networks that could be utilized with embodiments of the present invention, and embodiments of the present invention are contemplated for use with any service network.

According to preferred embodiments of the present invention, in consideration of maintaining privacy of the users of one or more service networks, an extending search service may be limited to users who subscribe to or signs up for an extending search service, or agrees with some terms of using the certain service.

According to an embodiment of the present invention, the extending search service may allow a user to select a portion of contacts on user's contact list as allowable entries for the extending search service. This allows a user to limit the number of entry contacts and potential target contacts for any given search. A contact being selected as an entry for the user conducting extending search is defined as an "entry contact". For any given extending search, the user conducting the search may select any number of entry contacts to search through. Entry contacts may be selected from the list of direct contacts associated with the user. "Direct contacts" are those contacts to whom the user is directly connected via one or more service networks.

According to an embodiment of the present invention, the extending search service may restrict the eligibility of an entry contact to only those contacts subscribing to or signing up for extending search service. In this manner, only those contacts who have previously agreed to be a part of the extending search service will be included, thereby protecting the privacy of non-user contacts.

According to an embodiment of the present invention, the extending search service may provide registered users the ability to select/limit the contacts who can conduct an extending search through them as well, including completely disallowing all users from conducting extending searches through them. This allows users to select only those contacts that they trust or otherwise are close enough with to search through their list of contacts. Further, this allows users to completely restrict searches through them if so desired. In other embodiments of the present invention, no registration is required to be included in an extending search.

According to an embodiment of the present invention, the extending search service may provide registered users the ability to select/limit the contacts that can be searched through them. This allows users to restrict extending searches that use the user as an entry contact such that only the direct contacts of the user that have been previously approved by the user can be included in the extending search. Advantageously, users can prevent a situation where numerous other users attempt to use them as a contact point for particular direct contact. For example, if a user had a famous contact, they could restrict extending searches using the user as an entry point for that famous contact, thereby removing the possibility of a deluge of contact requests for that famous contact from other users.

According to an embodiment of the present invention, the extending search service may define limits on how deep an extending search may go in number of tiers away from the user. In this manner, search results and processing requirements can be limited as defined the service network or the extending search service system.

In a preferred embodiment of the present invention, once entry contacts having been selected, the system will create an extending search service list within the database for the new user. The extending search service list may contain all the contacts of user's entry contacts excluding all the user's contacts and the contacts having not subscribing to or signing up for extending search service. In this preferred embodiment, a duplicated contact from a different entry contact is regarded as a different contact because of the different entry. In other embodiments, duplicate entries may be deleted. However, not all duplicate entries are truly duplicate as different entry contacts may have different permission associated with their respective contacts.

In such an embodiment, a contact list may contain a set of contact list categories. The system can be configured to create an extending search service list category for each corresponding contact list category. In a preferred embodiment, the extending search service list will not be disclosed to user and will be monitored by system to be updated as various permissions/restrictions/privileges are changed and accessed.

According to an embodiment of the present invention, the relevant data of the contacts listed in the extending search service list, or the contacts listed in an extending search service list category, or the contacts listed in a set of extending search service list categories with duplicates from the same entry contacts having being excluded from, is the search scope of an extending search depending on how the user chooses the search scope.

In certain embodiments, the extending search service may be configured to generate a temporary extending search service list for one or more users. The temporary extending search list may be used a limited number of times or only for a single search. In this manner, the temporary extending search list may be stored only in temporary memory (e.g., RAM, cache memory), thereby reducing the amount of data required to be stored in a database. Temporary extending search list may be useful where contact lists change frequently or users rarely utilize the same extending search service list more than once.

In other embodiments, an extending search service list is not utilized. In certain forms of these embodiments, the user either selects contacts individually for search or otherwise identifies one or more users to be searched for indirect contacts. In other forms of this embodiment, searches are performed against the entire list of contacts.

In certain embodiments, a potential target contact of an extending search, depending on search scope, includes: (i) a contact listed in the extending search service list, (ii) a contact listed in an extending search service list category, (iii) a contact listed in a set of extending search service list categories with duplicates from the same entry contacts having being excluded from, or (iv) any combination of (i)-(iii).

Once an extending search query from user has been implemented, the system will use the user setting stored in the database to outline the parameters of the search and. In a preferred embodiment, there are two types of methods to returning extending search result depending on the stored search requirements: (i) liberal mode; and (ii) strict mode. While the present disclosure discusses two such modes, one of ordinary skill in the art would appreciate that any number of search modes could be utilized, with varying levels of security or privacy protections, and embodiments of the present invention are contemplated for use with any number of search modes.

In a liberal mode, the system can directly return the extending search result to the user. In this manner, the user will be provided with a dataset of information associated with one or more contacts. Information included in the dataset may include, but is not limited to, names, contact information, personal information, professional information, media content (e.g., images, videos, text, audio) or any combination thereof. One of ordinary skill in the art would appreciate that there are numerous types of information that may be included in the dataset, and embodiments of the present invention are contemplated for use with any type of information.

On the other hand, in strict mode, the system will not reveal the target contacts directly to user, but would rather provide a gateway or other means for the user to contact the target contact(s). In a preferred embodiment of the present invention, a method to enable the user to come in touch with a target contact is achieved by creating a system message channel through the direct contact that is a direct contact of the user and the target contact. The contact that is the direct contact of both the user and the target contact is defined as a "potential middleman" in the present disclosure. The potential middleman can be further defined as a "middleman" when the potential middleman agrees to play as a message bridge between user and target contact.

Turning now to FIG. 1, an illustration of an exemplary networked system is shown. As illustrated, this exemplary system includes networks/internet 105, wireless network 110, client devices 101-104, extending search system 108, and service network server 106. Embodiments of the present invention may be accomplished through fewer or additional components, and embodiments of the present invention are contemplated for use with any number of the above referenced components.

In FIG. 1, various client devices 101-104 are connected to the extending search service system 108 via one or more networks (105, 112) and via an intervening service network server 106. In other embodiments, the client devices 101-104 may connect directly to the extending search service system 108 or via one or more networks (105, 112) without requiring an intervening service network server 106. For instance, the extending search service system 108 could be a standalone server providing extending search services across one or more networks to users and accessing data from one or more remote service network servers via an application programming interface (API) or other interface with such service network servers.

Extending search service system 108 is described in more detail below in conjunction with FIG. 2. Briefly, extending search system 106 may include any computer device capable of connecting with service network 106 and database 110.

One of ordinary skill in the art would appreciate that the name of "extending search service system" 108 does not necessarily confer that it only provides extending search service to a user, although it may. In fact, the extending search service system 108 can provide extending search services, search services for searching user's contacts, search services combining search service and extending search services, or any combination thereof. In general, the present disclosure focuses primarily on the discussion of extending search services.

According to an embodiment of the present invention, extending search service system 108 can (i) create, manage and monitor one or more extending search service lists; (ii) implement extending search queries from one or more users; (iii) directly return extending search results to one or more users under a liberal mode; (iv) monitor and manage the process flow of strict mode message methods to enable users to come into contact with one or more target contacts; (v) retrieve data from and store data into database 110; or (vi) provide any combination of (i)-(v). One of ordinary skill in the art would appreciate that there are numerous additional services that could be processed by the extending search service system in conjunction with the provision of the aforementioned services, and embodiments of the present invention are contemplated for use with any such additional services.

Figure 2A:
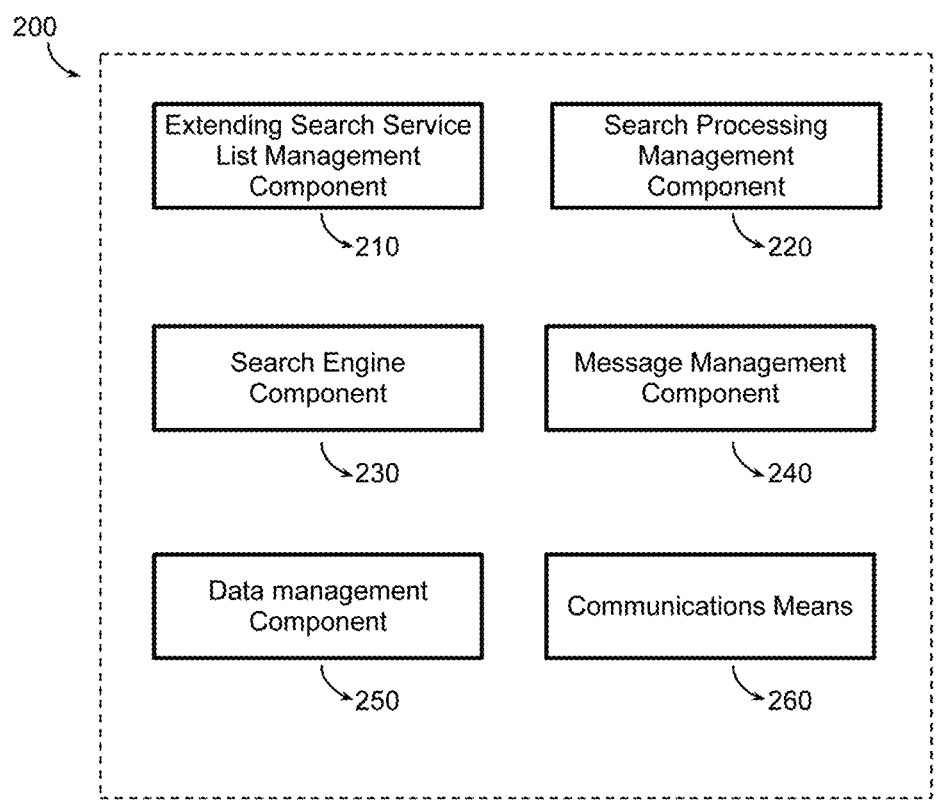
FIG. 2A is a schematic of an exemplary embodiment of an extending search system, in accordance with an embodiment of the present invention.
Figure 2B:
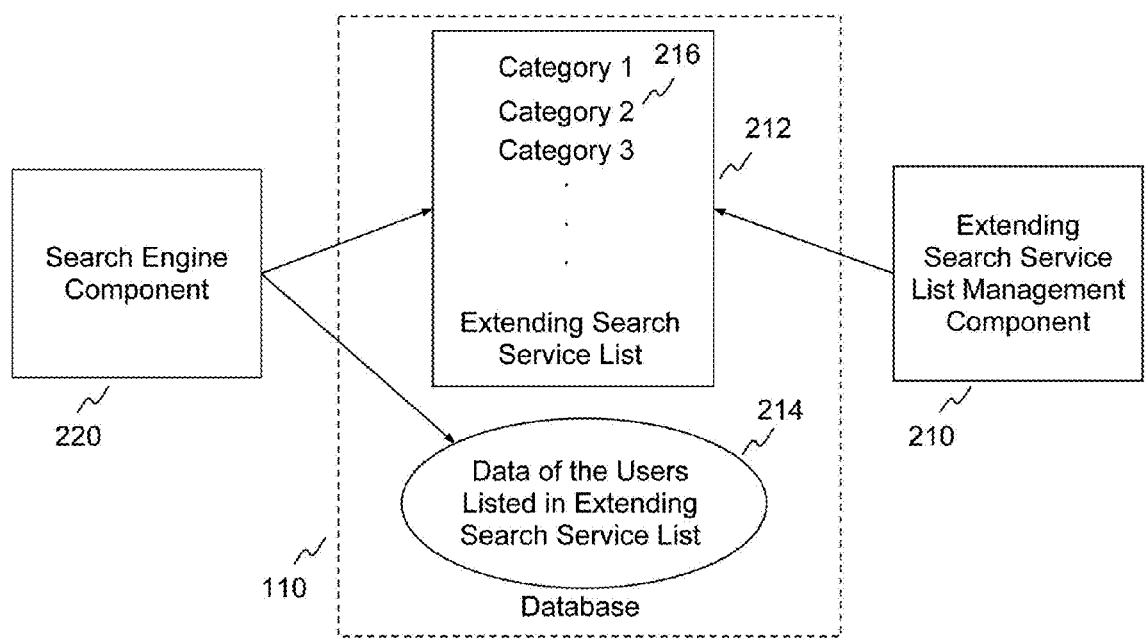
FIG. 2B is a schematic of a portion of an exemplary embodiment of an extending search system in accordance with an embodiment of the present invention.
Figure 2C:
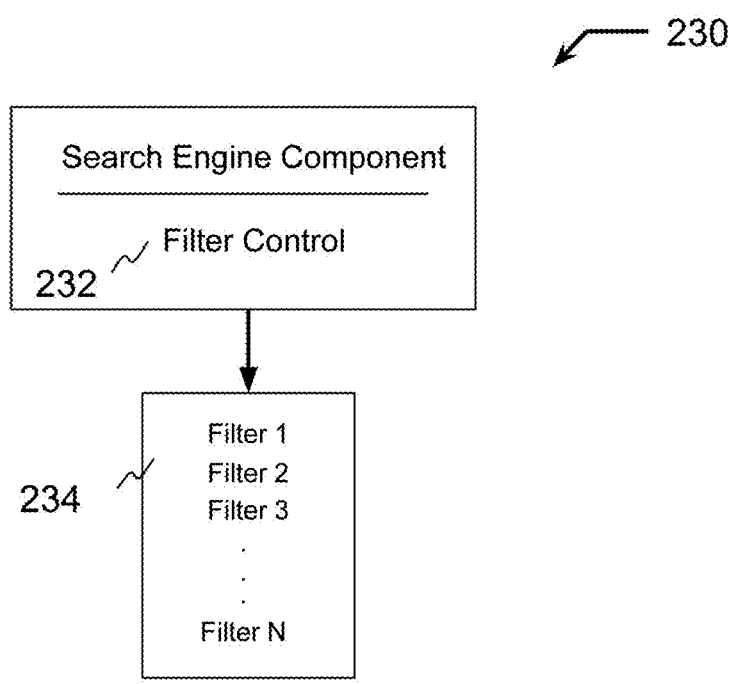
FIG. 2C is a schematic of an exemplary embodiment of a search engine component in accordance with an embodiment of the present invention.

Turning now to FIGS. 2A, 2B and 2C, illustrations of exemplary computer system architectures suitable for utilizing and/or providing an extending search service system are shown.

According to an embodiment of the present invention, the extending search service list management component 210 performs several functions related to contact list, including creating, deleting, sorting and managing extending search service list (or any subset thereof). When a new user has selected one or more entry contacts, the extending search service list management component 210 will create an extending search service list 212 which may include a set of extending search service list categories 216 for the new user. In a preferred embodiment of the present invention, the extending search service list 214 is stored in the database 110 and will not be disclosed to the user.

According to an embodiment of the present invention, the extending search service list 212 contains all the contacts of the entry contacts with contacts of user, contacts not subscribing to or signing up for extending search service and contacts of the entry contacts not subscribing to or signing up for extending contact search service having being excluded from. The same contact with different entry contacts is regard as different contacts.

According to an embodiment of the present invention, the search scope of an extending search may depends on at least (i) relevant data of the contacts listed in the extending search service list 212, (ii) the contacts listed in an extending search service list category 216, (iii) the contacts listed in a set of extending search service list categories 216 with duplicates from the same entry contacts having being excluded from, or (iv) any combination of (i)-(iii).

According to an embodiment of the present invention, depending on how a user chooses a search scope, potential target contacts include: (i) a contact listed in the extending search service list 212, (ii) a contact listed in an extending search service list category 216, (iii) a contact listed in a set of extending search service list categories 216 with duplicates from the same entry contacts having being excluded from, or (iv) any combination of (i)-(iii). The extending search service system may also play a role in defining search scope, such as through the definition of one or more parameters (e.g., maximum search depth level).

According to an embodiment of the present invention, the extending search service list 212 is monitored by the extending search service list management component 210 and may be updated in accordance with system settings (e.g., real-time, upon receipt of an event, manually implemented updates). In a preferred embodiment, when a change occurs (e.g. an entry contact deletes a contact from contact list), the extending search service list management component 210 will make a corresponding adjustments to it within the extending search service list.

According to an embodiment of the present invention, the search processing management component 220 is configured to monitor and manage the process flow of extending search service. Monitoring and management services may include, but not limited to: (i) receiving an extending search query from user of service network; (ii) assigning search task to search engine component 230 and receiving search result form it after search query has being complimented; (iii) determining the method of returning extending search result; or (iv) any combination of (i)-(iv). In embodiments of the present invention utilized with a liberal privacy policy, the system may return the result directly. Otherwise, the system may be configured to implement an appropriate message method. In embodiments where a message method is utilized, the search processing management component 220 may be further configured to (i) monitor and manage the process of message method; (ii) instruct the work of message management component 240 and data management component 250 in a message method; or (iii) any combination of (i) and (ii).

According to an embodiment of the present invention, the search engine component 230 may be configured to (i) execute the search task assigned by search processing management component 220, (ii) search the data of the contacts listed in the extending search service list, and (iii) return the search result to search processing management component 220. The search engine component 230 may also be configured to implement a plurality of selectable filters to filter at least a portion of the search result.

According to an embodiment of the present invention, a communications means 260 may be integrated into the system or communicatively connected to the system and configured to handle the transmission and receipt of data and communications between the system, user, client devices, networks, service networks or any combination thereof. Communications means include, but are not limited to Ethernet or other wired communications routers/switches/cards, wireless routers/switches/cards, fiber optic communications devices, cellular communications devices, or any combination thereof. One of ordinary skill in the art would appreciate that there are numerous types of communications means that could be utilized with embodiments of the present invention, and embodiments of the present invention are contemplated for use with any type of communications means.

Turning now to FIG. 2C, an Illustration showing the architecture of search engine is shown. The architecture 230 of search engine shown in FIG. 2C illustrates components comprising a plurality of filters 234 through a filter control 232 used to at least filter out a portion of contacts from the search result. Filtering can be done on any data type or portion of information (e.g., name, profession, age, religion, account age, data stored). One of ordinary skill in the art would appreciate that there are numerous types of filters that could be utilized with embodiments of the present invention, and embodiments of the present invention are contemplated for use with any type of filter.

According to an embodiment of the present invention, the message management component 240 can be configured to generate a system message in every step of a message method and can manage the transfer of message between different users. Allowing the system to control the entire message method process allows for the system to prevent users from circumventing the message method and requirements implemented on the system with respect to privacy and direct contacts.

According to an embodiment of the present invention the data management component 250 can be configured to retrieve data from the database and store data, such as extending search results and extending search histories as well as other data generated by the extending search, to the database.

Figure 3:
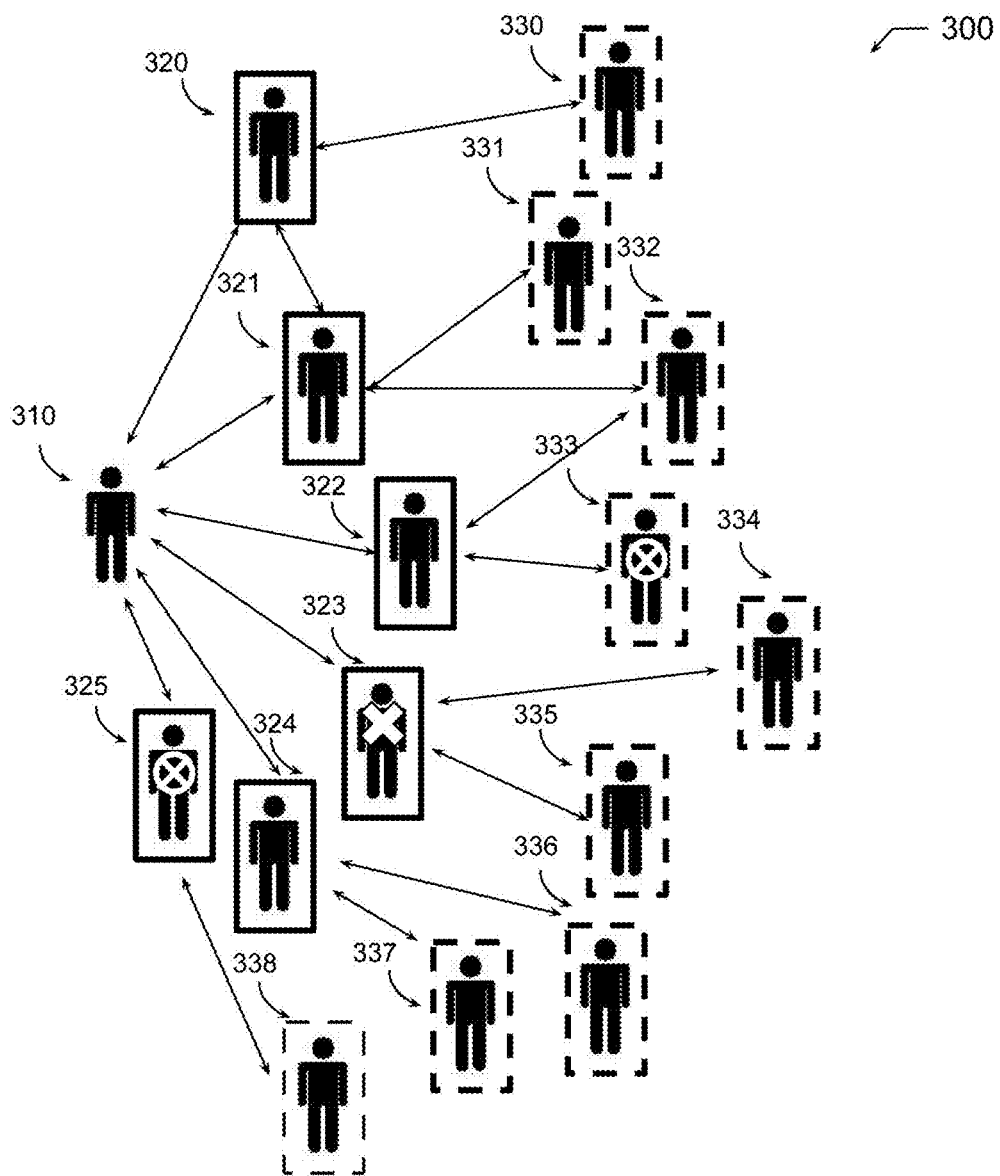
FIG. 3 is an illustration of a contact map, in accordance with an embodiment of the present invention.

Turning now to FIG. 3, an illustration explaining the composition of an extending search service list is shown. A graphical representation of an extending search service list, as shown in FIG. 3, may be called a "contact map" or "contact mapping".

According to the contact map of FIG. 3, the images of contacts from 320 to 325, highlighted with solid line box, are the contacts of user 310. The images of contacts from 330 to 338 highlighted with dash line box are the contacts of user's contacts (i.e., indirect contacts). Further shown in FIG. 3 is contact 333, shown with an circle X to represent that contact 333 has not signed up for an extending search service. In this representation, contact 333 will not be included into user's extending search service list. Secondly, because contact 325 has not signed up for an extending search service, so contact 325 will not be selected as an entry contact for user 310, thereby preventing contact 338 from being included into the extending search service list of user 310 (as contact 338 is only connected to the contact map via unregistered contact 325).

Continuing on analysis of FIG. 3, since contact 323 is not selected by user as an entry contact for an extending search service (as represented by the white X over contact 323), contact 334 and contact 335 are also not to be included in the extending search service list of user 310. Additionally, since contact 332 is a direct contact of contact 321 and contact 322, contact 332 can be regarded as two contacts. Embodiments of the system can be configured to combine them into a single contact with two separate entry contacts or keep them separate. A preferred embodiment of the present invention would denote them as contact 332 (via contact 321) and contact 332 (via contact 322). The names in parentheses represent the entry contact. The usefulness of having a contact 332 duplicated based on entry contact is apparent when one thinks about the varying relationships a user 310 may have with contact 322 and 321. User 310 may be more comfortable asking contact 322 to be a middleman as opposed to contact 321.

Finally, although contact 320 and contact 321 are direct contacts of each other, they are also contacts of user 310, so contact 320 and 321 should not be included into extending search service list in order to exclude redundant contacts. However, contact 320 and 321 may be included into extending search service list depending on the extending search method of a servicer networks. In a preferred embodiment, if a user wants to find a target contacts from his/her contact list, it could be easily achieved by utilizing a search of their contact list.

For the purpose of FIG. 3, as detailed above, the extending search service list should include contact 330, 331, 332 (via contact 321), 332 (via contact 322), 336, 337.

Figure 4A:
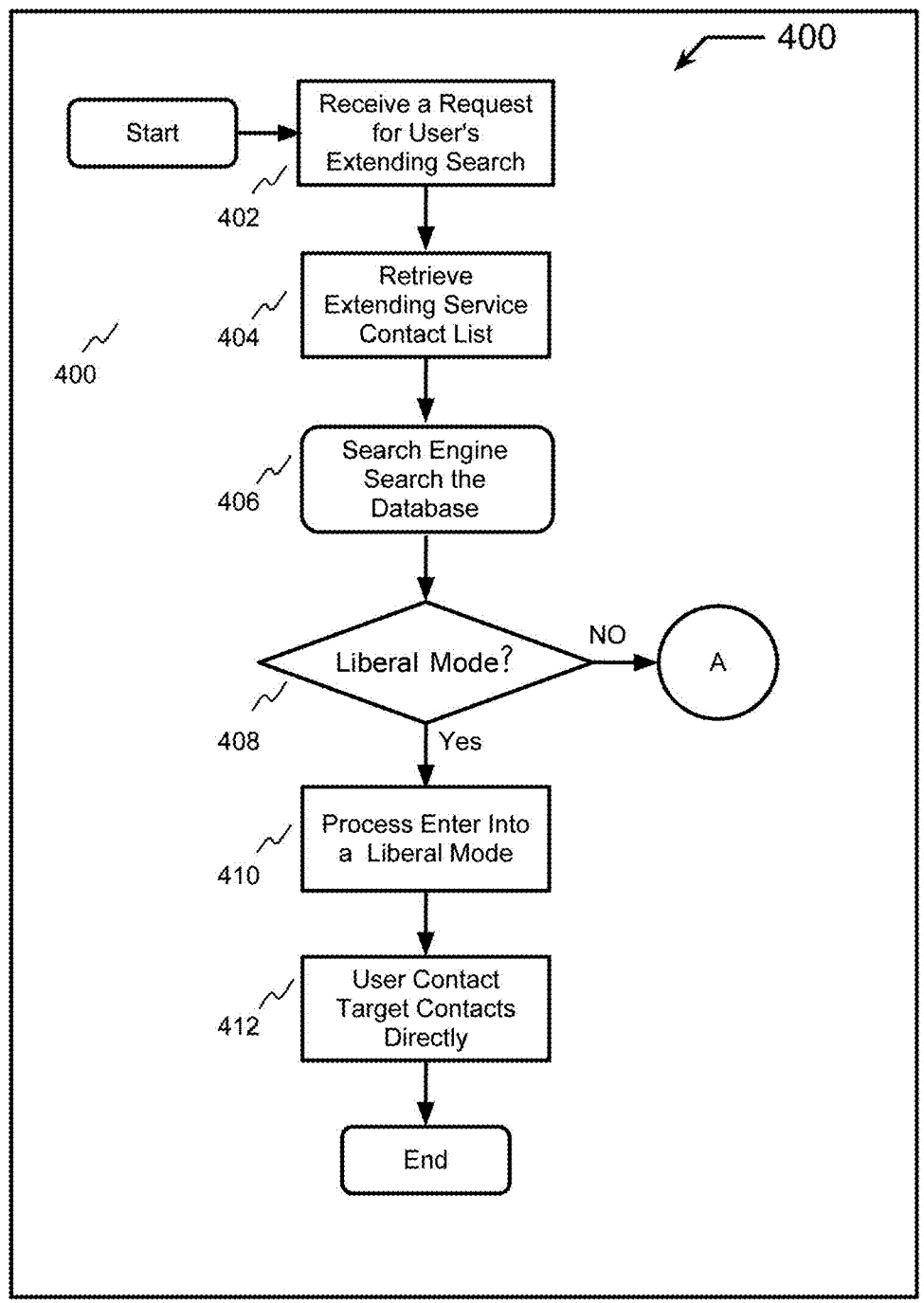
FIG. 4A is a flowchart of an exemplary method for an extended search, in accordance with an embodiment of the present invention.
Figure 4B:
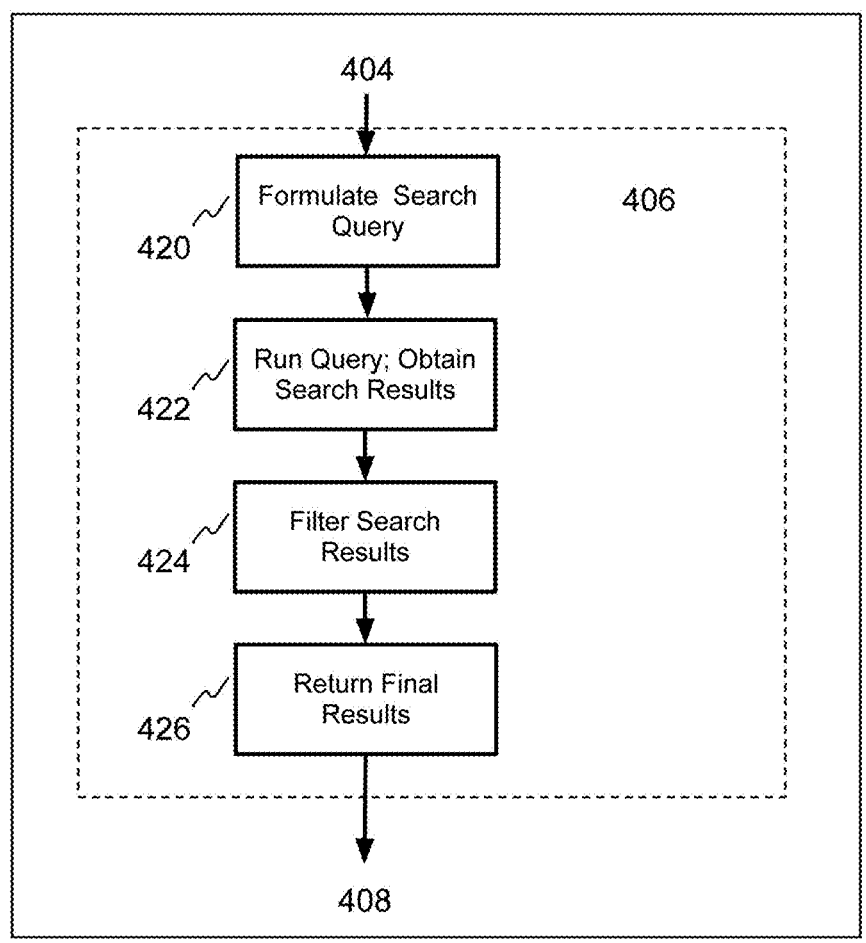
FIG. 4B is a flowchart of an exemplary method for an extended search, in accordance with an embodiment of the present invention.

Turning now to FIG. 4A, a flowchart of an exemplary method for providing extending search is shown. FIG. 4B is a flowchart of search engine workflow, as is described in detail after the discussion of FIG. 4A that follows. FIG. 4A illustrates a part of logical flow diagram generally showing one embodiment of a process for a system managing the flow of providing an extending search service.

The Process 400 begins, after a start block, at block 402, where a user generates a request for an extending search which is received by an extending search management component 220 within the user's social network. The user's request may be entered, for example through an interface program as described below with respect to FIG. 6.

At block 404, an extending search management component 220 retrieves extending search service list from the database and assigns the search task to search engine component 230.

At block 406, the search engine searches data of the contacts who are listed in the extending search service list with the database of the service network, then obtains and returns the search results. This step is discussed in more details in FIG. 4B.

Figure 8:
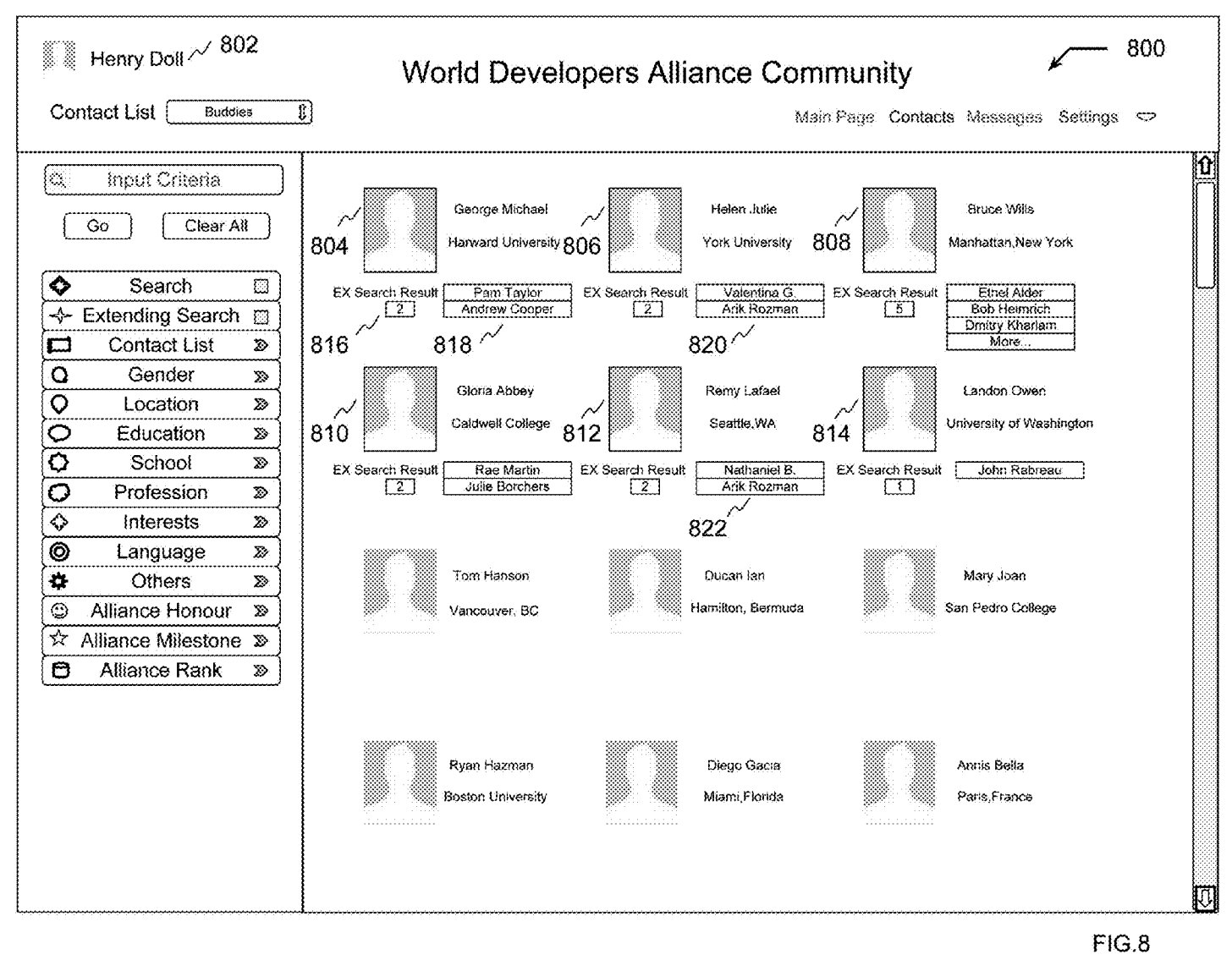

At decision block 408, the system determines the current privacy mode. In general this may be provided by the service network associated with the search or directly managed by the system. If the search is based on a liberal privacy mode, the process of extending search service enters into a liberal mode at block 410 and the system will directly return the extending search results to user as shown in FIG. 8 below. In this form, the target contacts' information (e.g., name, contact information) will be disclosed to the user.

At block 412, since the system is in liberal privacy mode (i.e., liberal mode), user can directly contact the target contacts through the contact's information which are provided by the system, an example of which is shown in FIG. 8. The exemplary method of providing extending search service process in liberal mode ends here.

Figure 5:
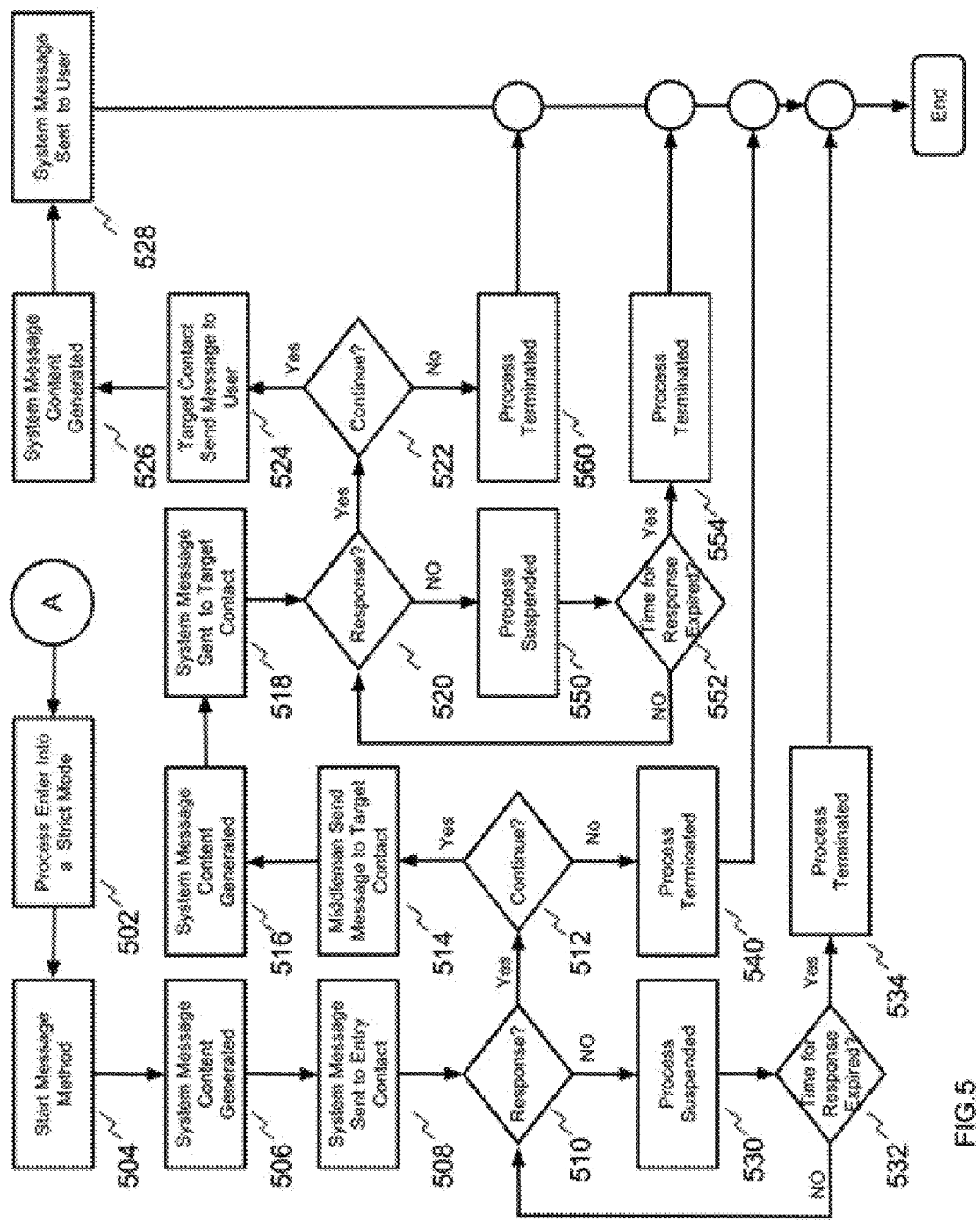
FIG. 5 is a flowchart of an exemplary method for an extended search, in accordance with an embodiment of the present invention.

On the other hand, if decision block 408 is not satisfied, denoting a strict privacy mode (i.e., strict mode) the process enters into a stricter model and will continue to block 502 that is shown in FIG. 5, described later in this disclosure.

Turning now to FIG. 4B, a flowchart illustrating a method of search engine executing a search. At block 420, the search engine component 230 formulates a search query based on criteria supplied by the user. For example, the search may be performed by looking for an individual's name in a particular company or in a particular city. (See, FIGS. 7A-7C).

At block 422, the search engine component 230 accesses the database to find target contacts relating to the search query and collects the search results. (See, FIGS. 7A-7C).

At block 424, the search engine component 230 filters the search results with a filter or a set of filters 234 selected by user or otherwise integrated with the system and obtains the final results. (See, FIGS. 7A-7C). In certain embodiments, steps 422 and 424 can be combined into a single step. In still further embodiments, step 424 is optional, such as the case where a user desires no filtering of the results. In yet further embodiments, parts of step 422 and 424 can be combined and then a separate step 424 can be completed, such as where certain filters are made by way of limits put on the database query and later filters are used on the already partially filtered result set provided by the database. One of ordinary skill in the art would appreciate there are numerous methods for filtering and searching that could be utilized with embodiments of the present invention, and embodiments of the present invention are contemplated for use with any method of searching and filtering.

At block 426, the search engine component 230 returns the final results to extending search management component 220.

Turning now to FIG. 5, a flowchart illustrating provision of an extending search in a strict mode is shown. Due to the restrictions on privacy in strict mode, the system does not delivery direct extending search results to a user.

Instead, at block 502, the system may be configured to not disclose the target contacts' name and relevant links to a user, but rather create a message channel to help the user find the target contacts through one or more potential middlemen. For example, as shown in FIG. 8, the system reveals a number under the name of selected contacts which means how many target contacts are the contacts of the certain person. The System also gives out a message link which could, for instance, generate a message channel by clicking a "Yes" button. The messages of the message channel may occur in any of a variety of methods. For instance, as noted above, the message channel may be completed through a webpage, software application, mobile application, messaging service (e.g., SMS, instant messaging system, online chat system), or any combination thereof. One of ordinary skill in the art would appreciate that there are numerous types of message channels that could be utilized with embodiments of the present invention, and embodiments of the present invention are contemplated for use with any type of message channel.

At block 504, user enters into message channel and sends a message to a potential middleman. At block 506 and 508, the first system message is generated and sent to the potential middleman. The process from 504 to 508 is described in sample below with respect to FIG. 9A and FIG. 9B.

Blocks 510 and 512 are two decision blocks, if both are satisfied that means the potential middleman prefers to play as a middleman between user and target contact, the process will go to block 514 where the middleman sends a message to target contact. At block 516 and 518, the second system message will be generated and send to target contact attached with a message from middleman. In certain embodiments, this second message may contain information regarding the user, including personal information, professional information, personalized message, audio, video, text, images or any combination thereof. One of ordinary skill in the art would appreciate that there are numerous types of information that could be sent along with the second message, and embodiments of the present invention are contemplated for use with any type of information.

Block 520 and 522 are another two decision blocks, if both are satisfied that means the target contact prefers to contact user back. When a target contact chooses to contact the user, a preferred method is through use of a system message because the user may have conducted a lot of searches and may not remember the reason of searching for the target contact. In alternate embodiments, contact between the target contact and the user can take place via any communications means (e.g., text, phone, video services, e-mail, SMS, instant messaging services).

Block 524, 526 and 528 are the steps for a target contact contacting user by adopting system message. At block 524, the target contact has determined to send the user a message. At block 526, the system generates the message content based on information received from the target contact for delivery to the user. At step 528, the system processes the transmission of the message to the user. Then after, process ends.

Back to decision block 510, in a preferred embodiment, if the user's contact choose to ignore the system message, the system will hang on the process until the time for response expired. In other embodiments, the system may identify to the user or to the middleman that direct contact is not desired by the target contact. This may be accompanied by a message or simply through inaction as noted above.

At decision block 512, the contact of the user (i.e., the potential middleman) has two choices. In a first choice, the system continues to execute the process of block 514 in response to the potential middleman's acceptance of the user's request to have the potential middleman contact the target contact on the user's behalf. The second choice is provided when a potential middleman declines the proposal from the user. If the potential middleman of the user chooses the later, the process will be terminated.

The situation that arises in another two decision blocks (520 and 522) is similar with the blocks 510 and 512 and follows the same course without need for further explanation.

Exemplary Interfaces

Below is a discussion of FIGS. 6-12C which represent an exemplary embodiment of multiple user interfaces that may be utilized by the present invention. Elements and designs shown are for disclosure purposes only and are not to be construed as required or limiting. One of ordinary skill in the art would appreciate that there are numerous user interface elements and designs that could be utilized with embodiments of the present invention and embodiments of the present invention are contemplated for use with any user interface element and design or none at all.

Figure 6:
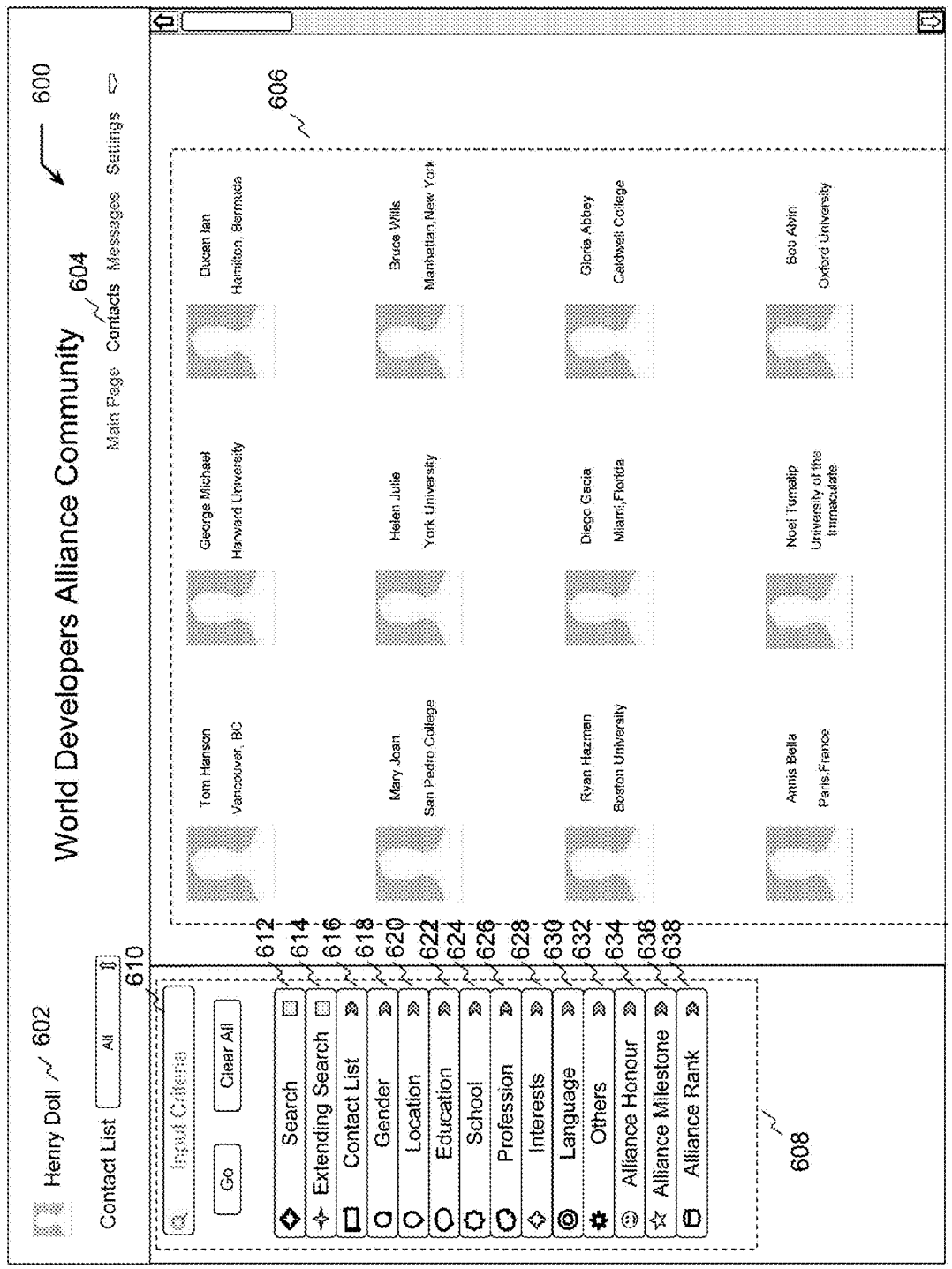
FIG. 6 illustrates a graphical user interface for performing an extending search, in accordance with an embodiment of the present invention.

Turning now to FIG. 6, an exemplary screen display showing an interface in accordance with the present invention is shown. FIG. 6 shows an interface 600 for a user of service network performing search and/or extending search to find target contacts. Although the service network of interface 600 provides search service to user in addition to extending search service, the present invention disclosure only discuss about extending search service.

While user 602 clicks Contacts 604, the interface presents a search interface to the user. The search interface mainly comprises two parts: (i) a contact list 606 and (ii) a search tools area 608. 610 is a search criterion input box. Search criterion could be, for example, a keyword or a set of keywords separated by semicolon between each other. In other embodiments, search criterion could be an image, a file, a concatenated string, or any other searchable information component. One of ordinary skill in the art would appreciate that there are numerous types of search criterion that could be utilized with embodiments of the present invention and embodiments of the present invention are contemplated for use with any search criterion.

Search option 612 and Extending Search option 614 are used to define the type of search. If only the search option 612 is selected, it means that the search will be limited to search the data of user's contacts; If only the extending search option 614 is selected, it means that the search will be limited to search the data of contacts listed in extending search service list extending search; If both are selected, it means the search would be a combination of search and extending search.

Contact list 616 comprises a set of contact list categories which are used to define the scope of extending search. From 618 Gender to 638 Alliance Rank are a plurality of filter categories, each containing a set of filters, or a set of filter subcategories, and the filter subcategories may containing next level filter subcategories. The filters listed in the filter categories or filter subcategories are used to filter at least a portion of search result. In fact, user could find out target contacts from the extending search service list by using filters only and directly. While certain filters, filter categories and filter sub-categories are enumerated, one of ordinary skill in the art would appreciate that there are numerous other filters, filter categories and filter sub-categories that could be utilized with embodiments of the present invention, and embodiments of the present invention are contemplated for use with any filter, filter category and filter sub-category, including combinations thereof or variations thereupon.

Figure 7A:
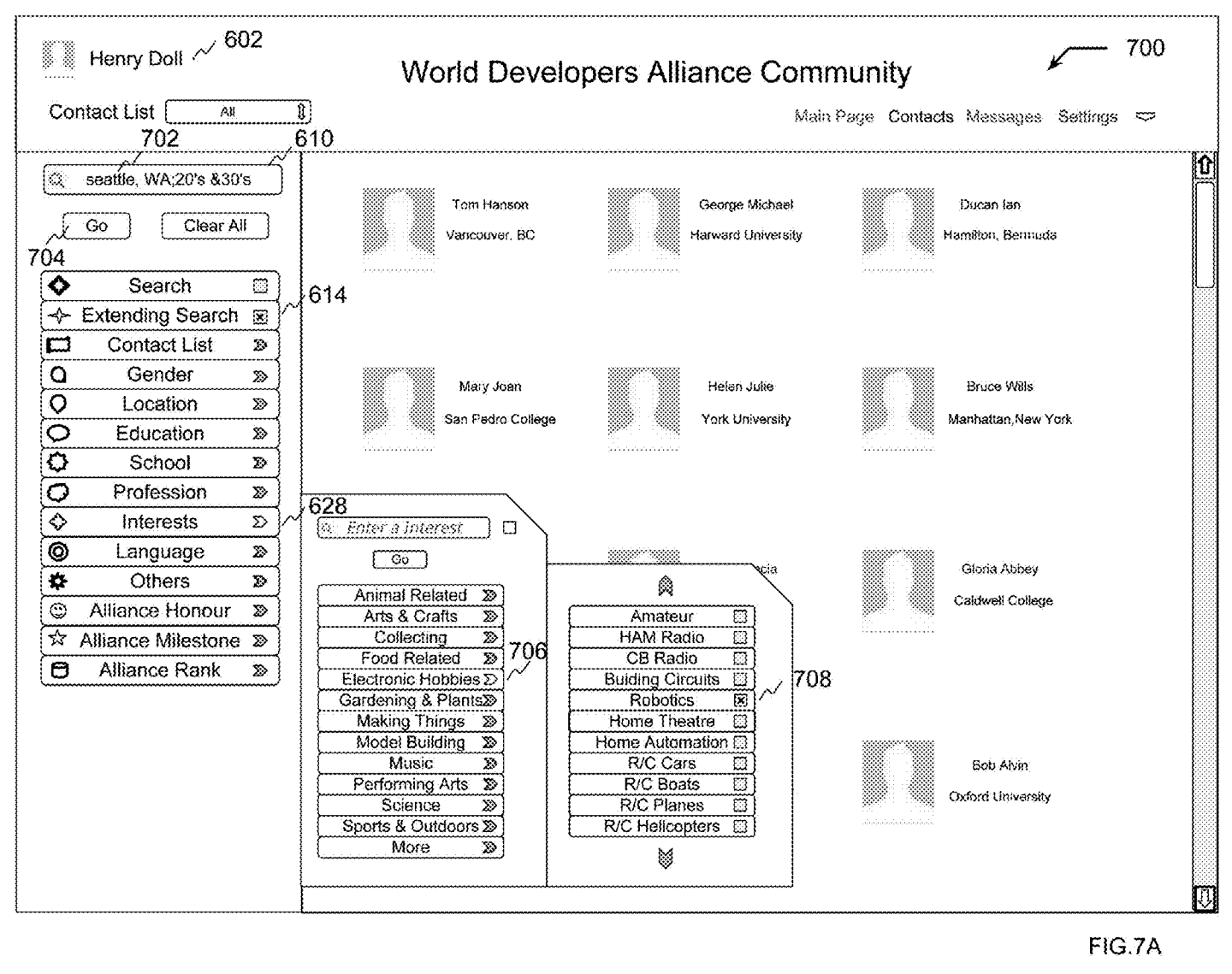
Figure 7B:
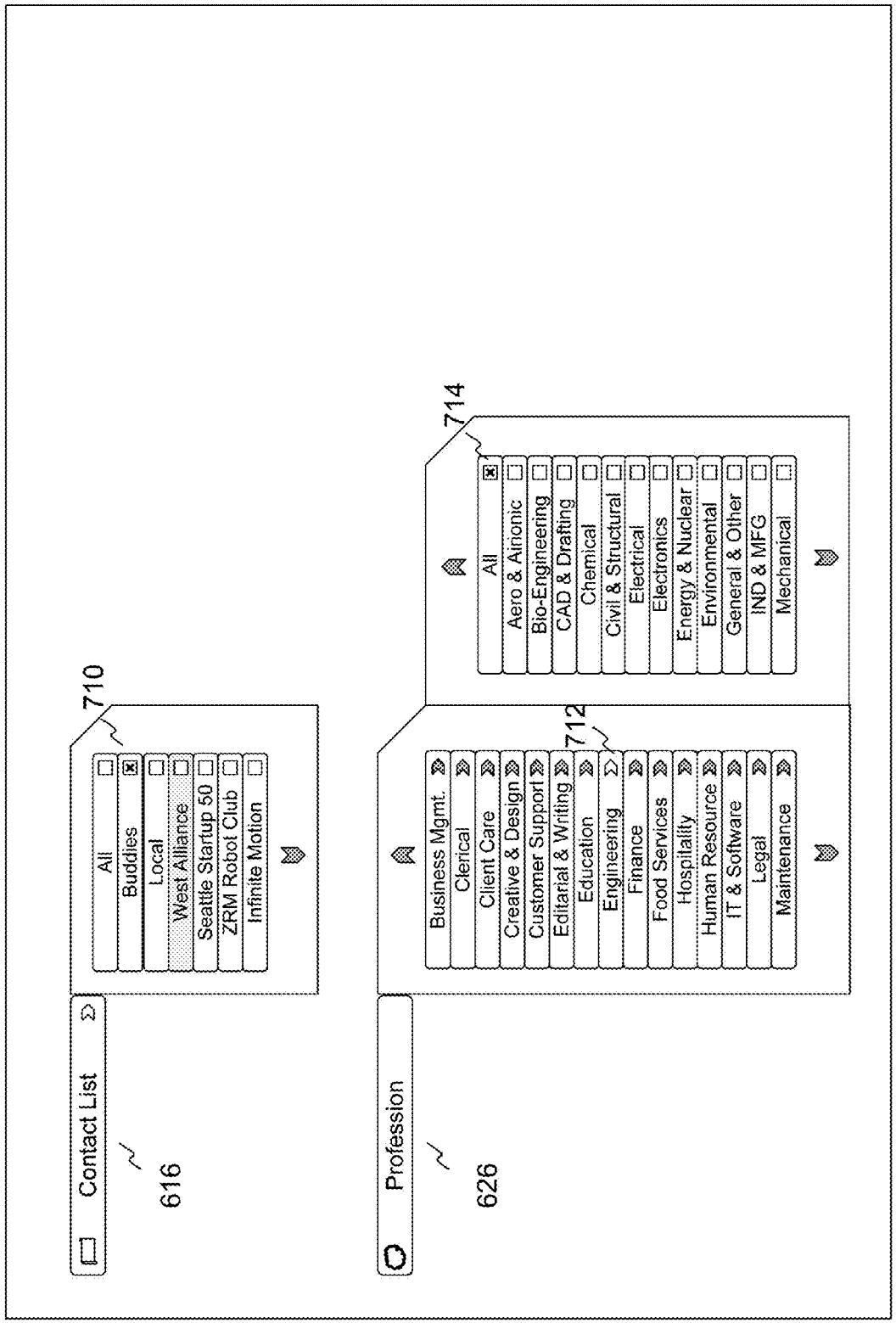
Figure 7C:
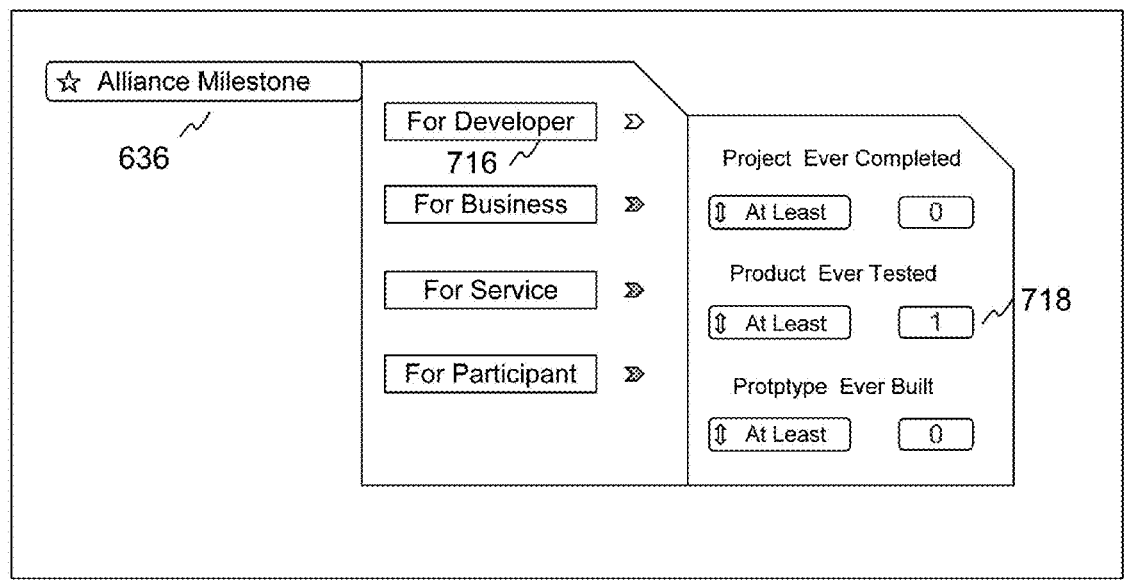

Turning now to FIGS. 7A-7C, an exemplary embodiment of a user performed combined search is shown. In this example, Henry Doll wants to build a high performance robot model and feels it is necessary to find several experienced engineers to join him. Therefore, he tries to realize this goal by searching the social network World Developers Alliance Community. The user 602 summits the query 702 "seattle, WA;20's&30's" in the search box 610 that means the target contacts should be based in Seattle, Wash. and the ages of target contacts should be in the range of 20-39.

Continuing from above, Extending Search option 614 is selected that means the user's query is an extending search. Filter Robotics 708 of filter subcategory Electronics Hobbies 706 of filter category Interests 628 is selected.

In FIG. 7B, Buddies 710 of category Contact List 616 is selected to define the search scope is the data of the user listed in the Buddies category of extending search service list. Filter All 714 of filter subcategory Engineering 712 of filter category Profession 626 is selected.

In FIG. 7C, the number 1 is filled into textbox 718 as a part of filter "Product Ever Test At Least 1" of filter subcategory For Developer 716 of category Alliance Milestone 636.

Therefore, the target contacts should be those people who are aged from 20-39, Seattle-based engineers with interest in robot developing, at least having ever creating a technical product and the entry contacts are from buddies list.

When the user 602 clicks the go button 704 in FIG. 7A, the search engine component will use keywords "seattle,WA" and "20's&30's" to search the data of the contacts who are listed in extending search service list firstly, and then use filters Robotics 708, filter Buddies 710, filter All 722 and filter "Product Ever Test At Least 1" to filter out the unmatched people from the result of previous search.

Turning now to FIG. 8, an extending search result returning in a liberal mode is shown. FIG. 8 shows the illustration 800 of an extending search results returning in a liberal mode. The images of contacts 804, 806, 808, 810, 812 and 814 highlighted with solid line box are the contacts who have contacts matching the extending search query.

The figures listed under contacts' images as figure 816 shown disclose how many target contacts the entry contact have as contacts. The names listed beside the figures as name 818 shown disclose the names of target contacts being found by the extending search. With the name links, user can choose to contact target contacts directly or request entry contact introducing. Target contacts 820 and 822 are the same person but with different entry contacts.

Figure 9A:
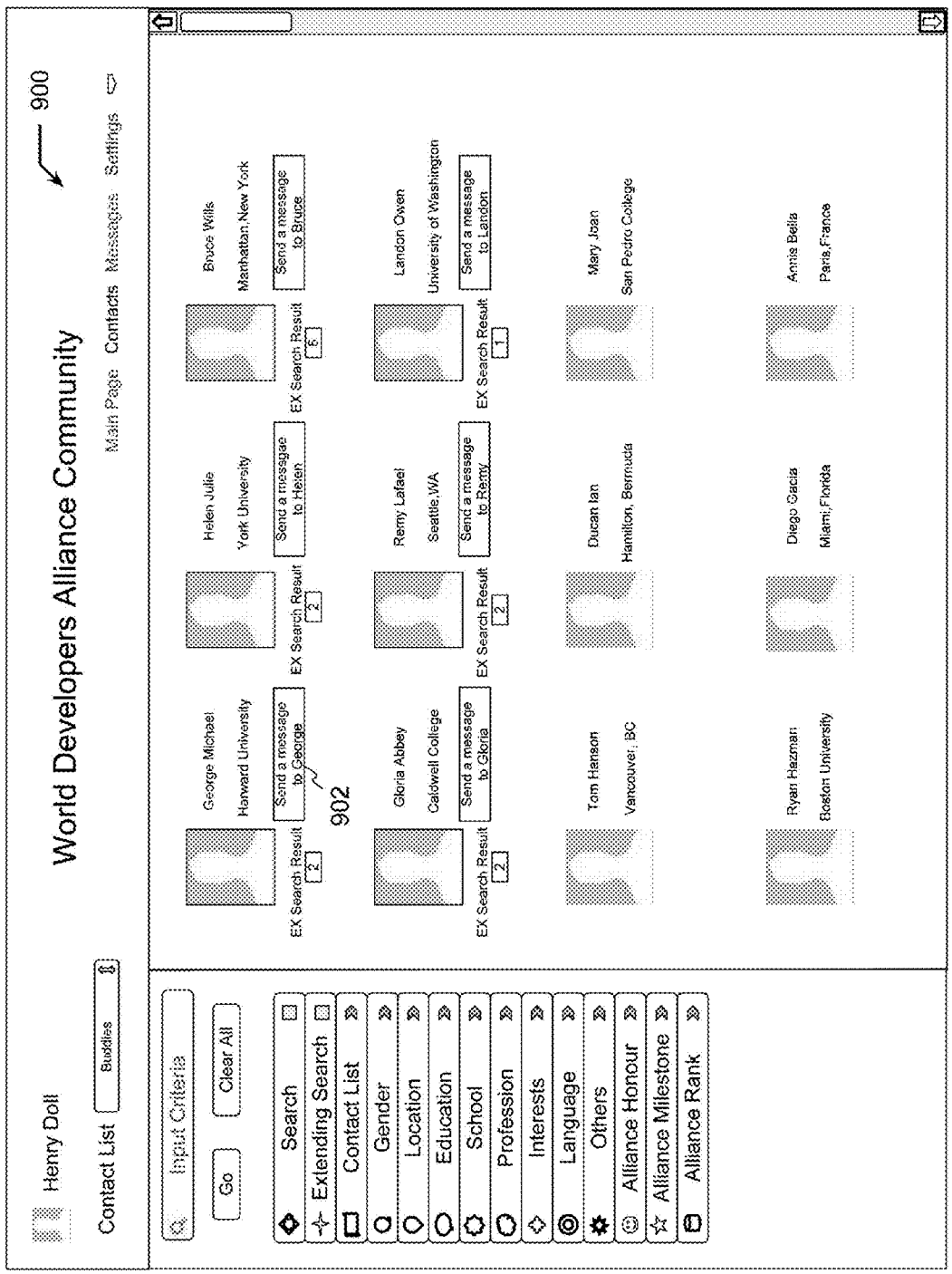
FIG. 9A-B are illustrations a graphical user interface showing results of an extending search, in accordance with an embodiment of the present invention.
Figure 9B:
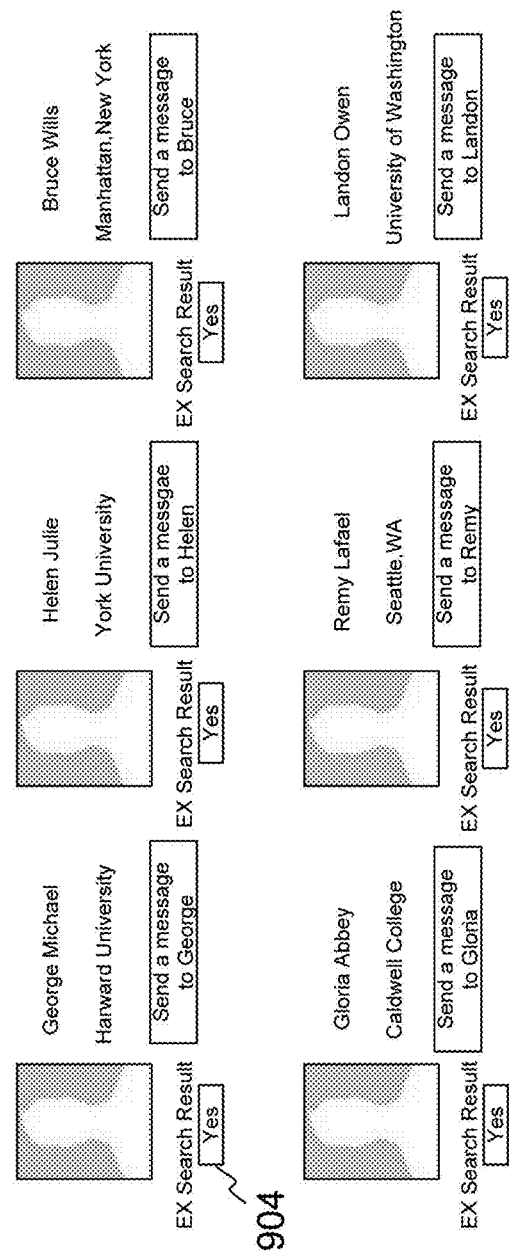

Turning now to FIGS. 9A and 9B, an extending search result returning in a strict mode is shown. FIG. 9A shows the illustration 900 of a combined including search and an extending search returning in a strict mode. In the strict model, the target contacts' names which are shown in FIG. 8 will not be disclosed instead of message links similar to link 902.

In a strict mode, the only method for user getting in touch with target contacts is through message method that can be activated by clicking links similar to link 902. The method is shown in the FIG. 11

FIG. 9B shows an alternative method of result returning in a strict mode, with even stricter privacy settings. The figure similar to figure 814 in the FIG. 8 is replaced by a Yes 904 which only give out a confirmation that the entry contacts having at least a contact of target contact.

Figure 10:
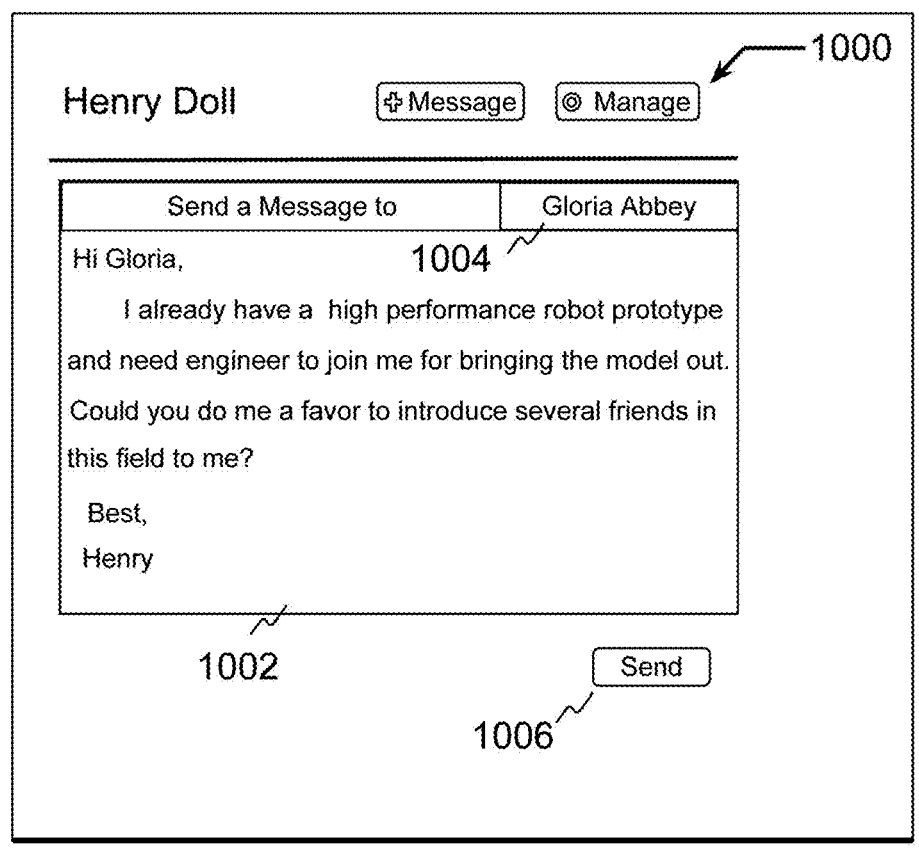
FIG. 10 illustrates a graphical user interface showing a middleman contact request, in accordance with an embodiment of the present invention.

Turning now to FIG. 10, a user's message to a potential middleman is shown. The illustration 1000 includes a screen display of message 1002 from user to a potential middleman 1004. While the user clicks the send button 1006, the system will generate a system message to the potential middleman 1004 attached with this message 1002.

Figure 11A:
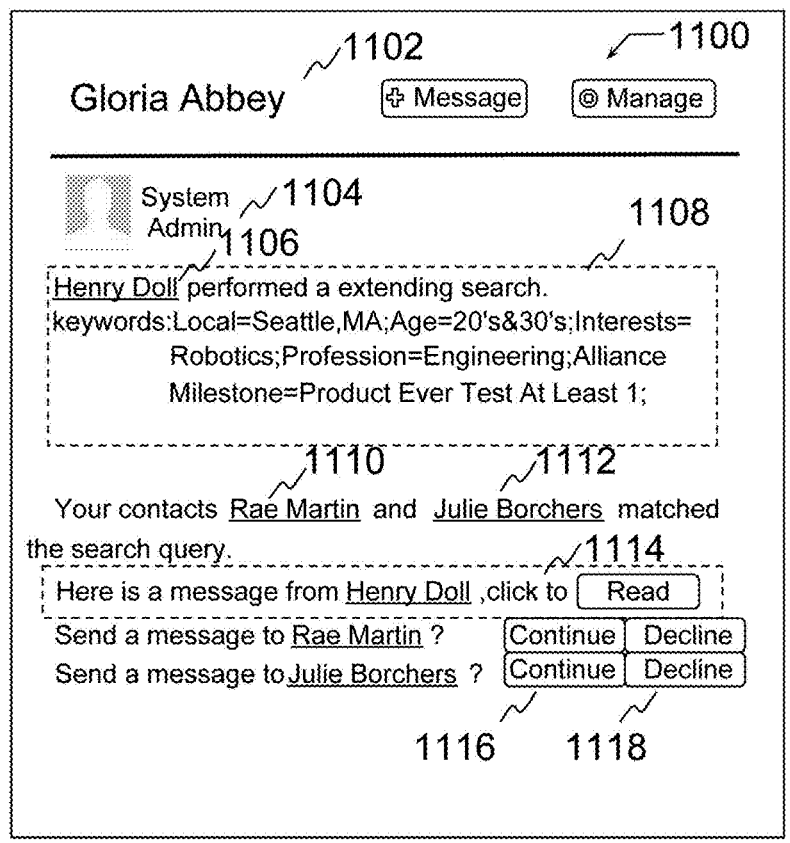
FIG. 11A-B are illustrations a graphical user interface showing a middleman interface, in accordance with an embodiment of the present invention.
Figure 11B:
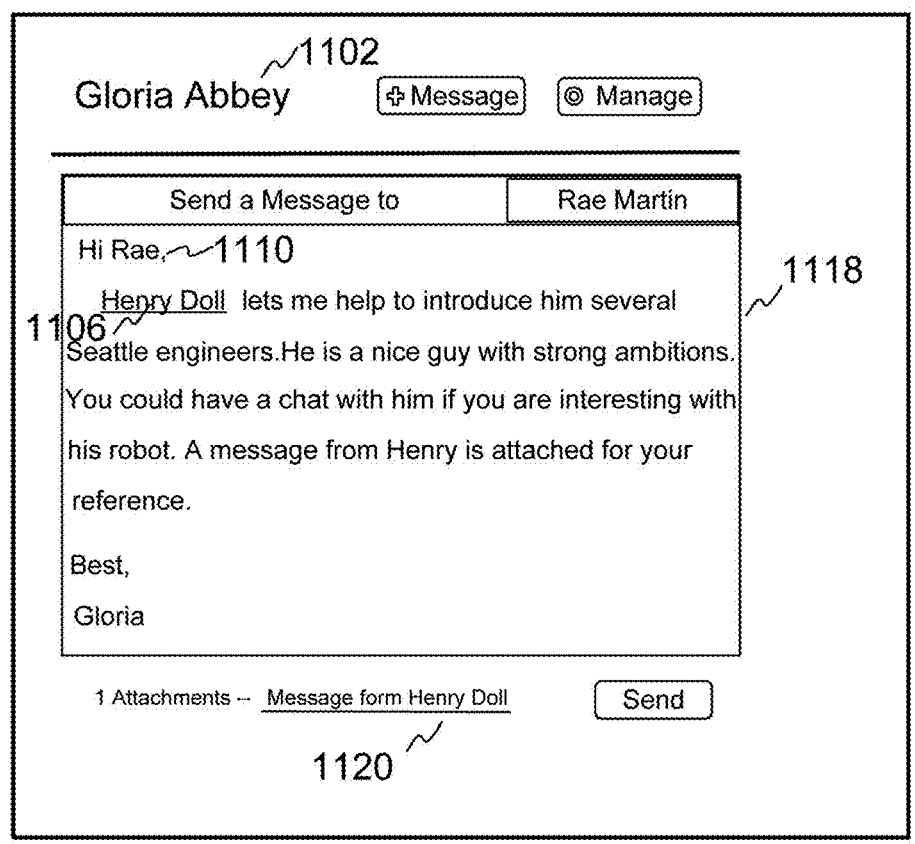

Turning now to FIGS. 11A and 11B, an exemplary screen displays showing the message that a potential middleman received and the message that a middleman will send to a target contact. The illustration 1100 shows an exemplary screen display of a message which was generated by system 1104 and received by a potential middleman 1102. System admin 1104 informs a potential middleman 1102 the reason 1108 why this system message 1100 was generated and discloses the criterion which was used in the extending search from user 1106, and also discloses the extending search result of two target contacts 1110 and 1112. Target contact 1112 shows there is a message from the user 1106 which is attached with this system message 1100.

In response to this system message 1100, the potential middlemen 1102 could choose to continue 1116 the process by playing a middleman between the user 1106 and the target contacts 1110 and 1112, or decline 1118 the proposal, or ignores this system message. If the potential middleman chooses to ignore the system message, the system will hang on the process until the time for response expired.

FIG. 11B shows that the contacts 1102 of user 1106 chooses to continue the process by agreeing to play a middleman between the user 1106 and the target contact 1110, and writes a message 1118 to target contact 1110. Furthermore, the middleman 1102 attaches a message 1120 from user 1106 with this message for the reference of target contact 1110.

Figure 12A:
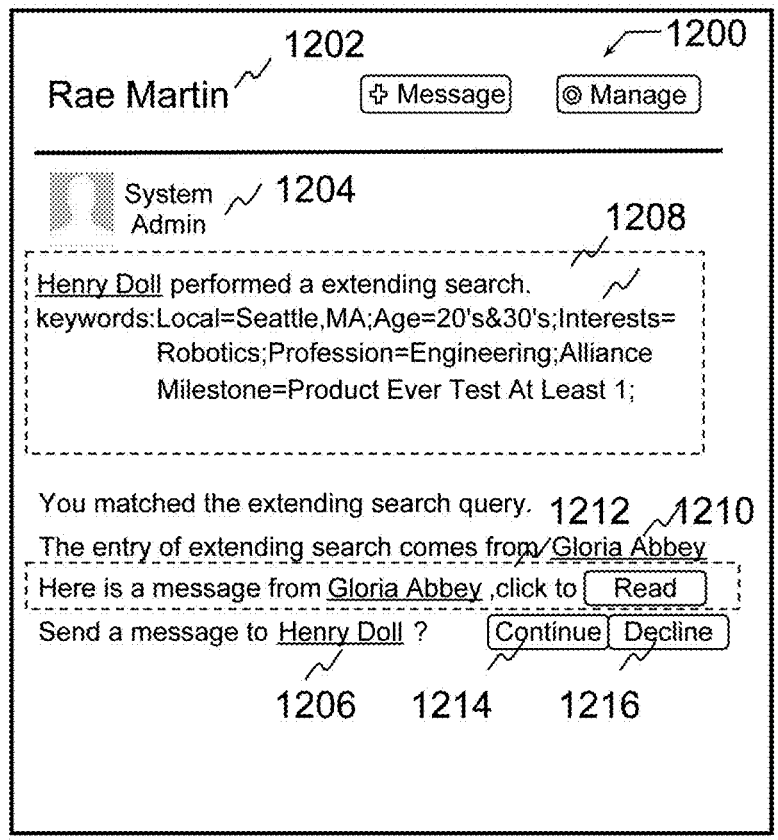
FIG. 12A-C illustrates a graphical user interface showing a target contact interface, in accordance with an embodiment of the present invention.

Turning now to FIG. 12A, an exemplary embodiment of a screen display showing the message received by target contact is shown. The illustration 1200 shows an exemplary screen display of a message which was generated by system and received by a target contact 1202.

System admin 1204 informs a target contact 1202 the reason 1208 why this system message 1200 was generated and discloses the criterion which were used in the extending search from user 1206, and also discloses the middleman 1210. Text component 1212 shows there is a message from the middleman 1210 which is attached with this system message 1200.

In response to this system message 1200, the target contact 1202 could choose to use system message replying to user 1206 by clicking "Continue" 1214, or contact the user directly, or decline 1216 the proposal, or ignore this system message. If the target contact chooses to ignore the system message, the system will hang on the process until the time for response expires.

Figure 12B:
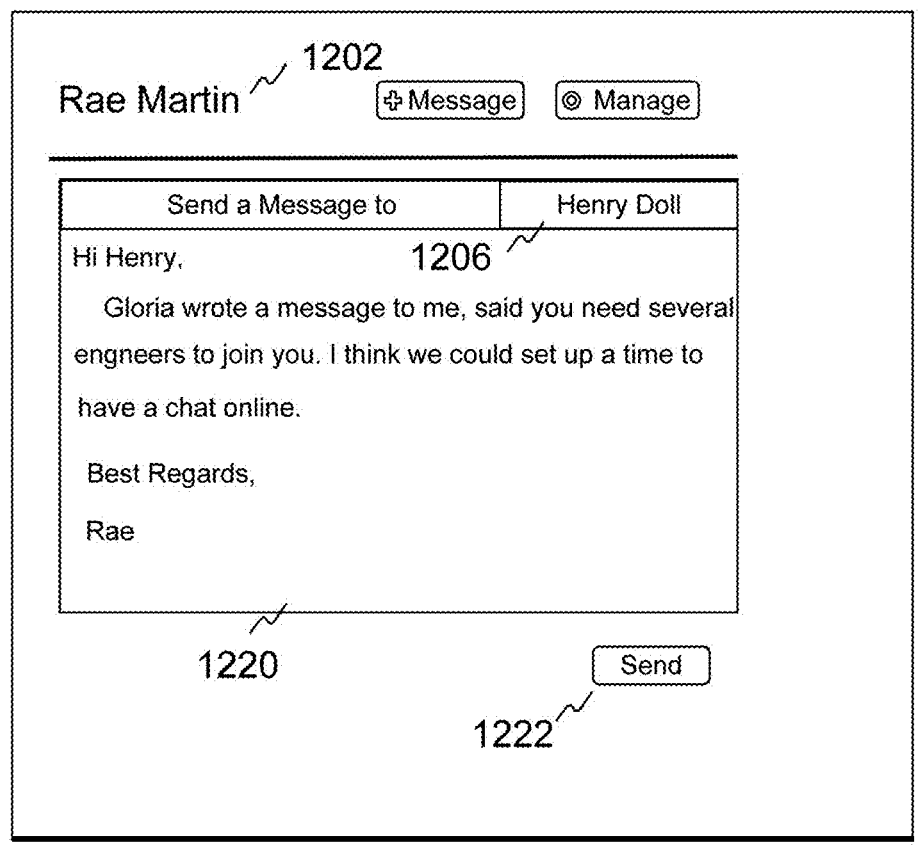

FIG. 12B includes an exemplary screen displays showing the message written by target contact to user. In this figure, the target contact 1202 is sending a message to the user 1206. The body of the text 1220 is shown in the drafting pane of the window and a "send" button 1222 is depicted in the lower right hand side of the window. One of ordinary skill in the art would appreciate these are merely design choices and embodiments of the present invention can be utilized with text and data components of any design type and format.

Figure 12C:
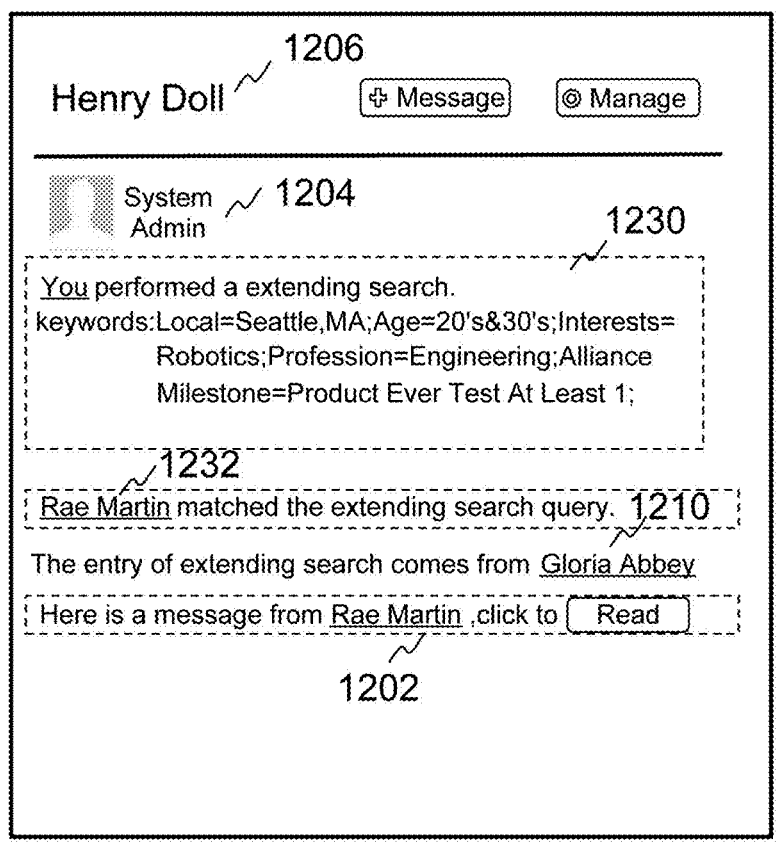

FIG. 12C includes an exemplary screen displays showing the system message received by user. In this figure, the user 1206 has received an update on their search in the form of a message 1230 from the system (system admin 1204). Relevant information is displayed below this message 1230 in the form of an identification of the target contact 1232 and the entry contact 1210 as well as an actionable link 1202 to the message transmitted by the target contact to the user. One of ordinary skill in the art would appreciate these are merely design choices and embodiments of the present invention can be utilized with text and data components of any design type and format.

Throughout this disclosure and elsewhere, block diagrams and flowchart illustrations depict methods, apparatuses (i.e., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "circuit," "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

Traditionally, a computer program consists of a finite sequence of computational instructions or program instructions. It will be appreciated that a programmable apparatus (i.e., computing device) can receive such a computer program and, by processing the computational instructions thereof, produce a further technical effect.

A programmable apparatus includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of at least one general purpose computer, special-purpose computer, programmable data processing apparatus, processor, processor architecture, and so on.

It will be understood that a computer can include a computer-readable storage medium and that this medium may be internal or external, removable and replaceable, or fixed. It will also be understood that a computer can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the invention as claimed herein could include an optical computer, quantum computer, analog computer, or the like.

Regardless of the type of computer program or computer involved, a computer program can be loaded onto a computer to produce a particular machine that can perform any and all of the depicted functions. This particular machine provides a means for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

In view of the foregoing, it will now be appreciated that elements of the block diagrams and flowchart illustrations support combinations of means for performing the specified functions, combinations of steps for performing the specified functions, program instruction means for performing the specified functions, and so on.

It will be appreciated that computer program instructions may include computer executable code. A variety of languages for expressing computer program instructions are possible, including without limitation C, C++, Java, JavaScript, assembly language, Lisp, HTML, and so on. Such languages may include assembly languages, hardware description languages, database programming languages, functional programming languages, imperative programming languages, and so on. In some embodiments, computer program instructions can be stored, compiled, or interpreted to run on a computer, a programmable data processing apparatus, a heterogeneous combination of processors or processor architectures, and so on. Without limitation, embodiments of the system as described herein can take the form of web-based computer software, which includes client/server software, software-as-a-service, peer-to-peer software, or the like.

In some embodiments, a computer enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computer can process these threads based on priority or any other order based on instructions provided in the program code.

Unless explicitly stated or otherwise clear from the context, the verbs "execute" and "process" are used interchangeably to indicate execute, process, interpret, compile, assemble, link, load, any and all combinations of the foregoing, or the like. Therefore, embodiments that execute or process computer program instructions, computer-executable code, or the like can suitably act upon the instructions or code in any and all of the ways just described.

The functions and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, embodiments of the invention are not described with reference to any particular programming language. It is appreciated that a variety of programming languages may be used to implement the present teachings as described herein, and any references to specific languages are provided for disclosure of enablement and best mode of embodiments of the invention. Embodiments of the invention are well suited to a wide variety of computer network systems over numerous topologies. Within this field, the configuration and management of large networks include storage devices and computers that are communicatively coupled to dissimilar computers and storage devices over a network, such as the Internet.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

The invention claimed is:

1. A computer implemented system for providing an extending search, the system comprising:
    an extending search service list management component comprising computer-executable code stored in non-volatile memory;
    a search engine component comprising computer-executable code stored in non-volatile memory;
    a data management component comprising computer-executable code stored in non-volatile memory;
    a search processing management component comprising computer-executable code stored in non-volatile memory;
    a processor; and
    a communications means,
    wherein said extending search service list management component, said search engine component, said data management component, said search processing management component, said processor, and said communications means are operably connected and are configured to:
    receive a request from a first user regarding an extending search for one or more contacts;
    retrieve an extending service contact list associated with said first user, wherein said extending service contact list comprises data associated with one or more direct contacts, said one or more direct contacts representing a first level of contacts;
    designate an entry contact from said contact list;
    search data associated with said entry contact to identify indirect contacts associated with said entry contact, wherein said indirect contacts represent a second level of contacts;
    identify a group of contacts comprising one or more indirect contacts;
    search data associated with said indirect contacts to identify contacts of said indirect contacts, said contacts of said indirect contacts representing a third level of contacts, wherein the search for further removed levels of contacts is limited to a specified depth level;
    enter a strict mode in which the group of contacts are not revealed to said first user; and
    generate and transmit a message to at least one of said group of contacts by:
        (1) creating a message channel from said first user, through at least one direct contact of said first user, to said at least one of said group of contacts,
        (2) generating and transmitting a first message to said at least one direct contact of said first user,
        (3) receiving middleman approval from said at least one direct contact to serve as a message bridge between said first user and said at least one contact of said group of contacts,
        (4) generating a middleman message from said at least one direct contact, and
        (5) transmitting said middleman message to said at least one contact identified in said group of contacts.

2. The system of claim 1, wherein said extending search service list is generated from a list of contacts associated with said first user.

3. The system of claim 1, wherein said data associated with said one or more direct contacts includes information related to whether said first user can use one or more of said one or more direct contacts as an entry contact.

4. The system of claim 1, wherein said extending search service list management component, said search engine component, said data management component, said search processing management component, said processor, and said communications means are further configured to:
    enter a liberal mode, wherein the system returns a dataset of information associated with said group of contacts to said first user, said dataset comprises names, contact information, personal information, professional information, media content, or any combination thereof.

5. The system of claim 1, wherein said middleman message includes search information contained in said request.

6. The system of claim 1, wherein said message includes search information contained in said request.

7. A computer implemented method for providing an extending search, the method comprising the steps of:
    receiving a request from a first user regarding an extending search for one or more contacts;
    retrieving an extending service contact list associated with said first user, wherein said extending service contact list comprises data associated with one or more direct contacts, said one or more direct contacts representing a first level of contacts;
    designating an entry contact from said contact list;
    searching data associated with said entry contact to identify indirect contacts associated with said entry contact, wherein said indirect contacts represent a second level of contacts; and
    identifying a group of contacts comprising one or more indirect contacts;
    searching data associated with said indirect contacts to identify contacts of said indirect contacts, said contacts of said indirect contacts representing a third level of contacts, wherein the search for further removed levels of contacts is limited to a specified depth level;
    entering a strict mode in which the group of contacts are not revealed to said first user; and
    generating and transmitting a message to at least one of said group of contacts by:
        (1) creating a message channel from said first user, through at least one direct contact of said first user, to said at least one of said group of contacts,
        (2) generating and transmitting a first message to said at least one direct contact of said first user,
        (3) receiving middleman approval from said at least one direct contact to serve as a message bridge between said first user and said at least one of said group of contacts,
        (4) generating a middleman message from said at least one direct contact, and
        (5) transmitting said middleman message to said at least one contact identified in said group of contacts.

8. The method of claim 7, wherein said extending search service list is generated from a list of contacts associated with said first user.

9. The method of claim 7, wherein said data associated with said one or more direct contacts includes information related to whether said first user can use one or more of said one or more direct contacts as an entry contact.

10. The method of claim 7, further comprising the steps of:
   entering a liberal mode, wherein the system returns a dataset of information associated with said group of contacts to said first user, wherein said dataset comprises names, contact information, personal information, professional information, media content, or any combination thereof.

11. The method of claim 7, wherein said middleman message includes search information contained in said request.

12. The method of claim 7, wherein said message includes search information contained in said request.

\* \* \* \* \*